United States Patent Office 3,737,287
Patented June 5, 1973

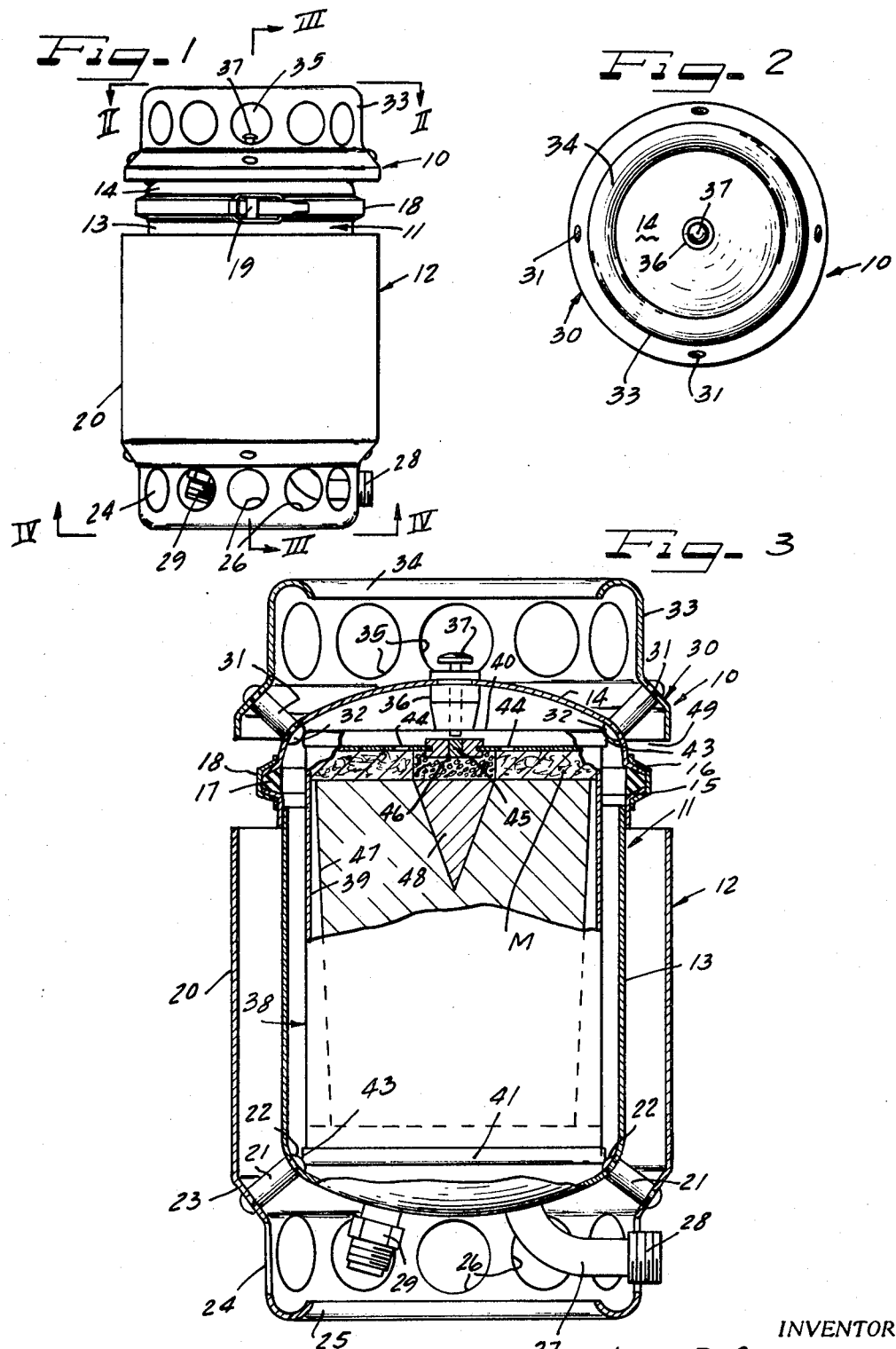

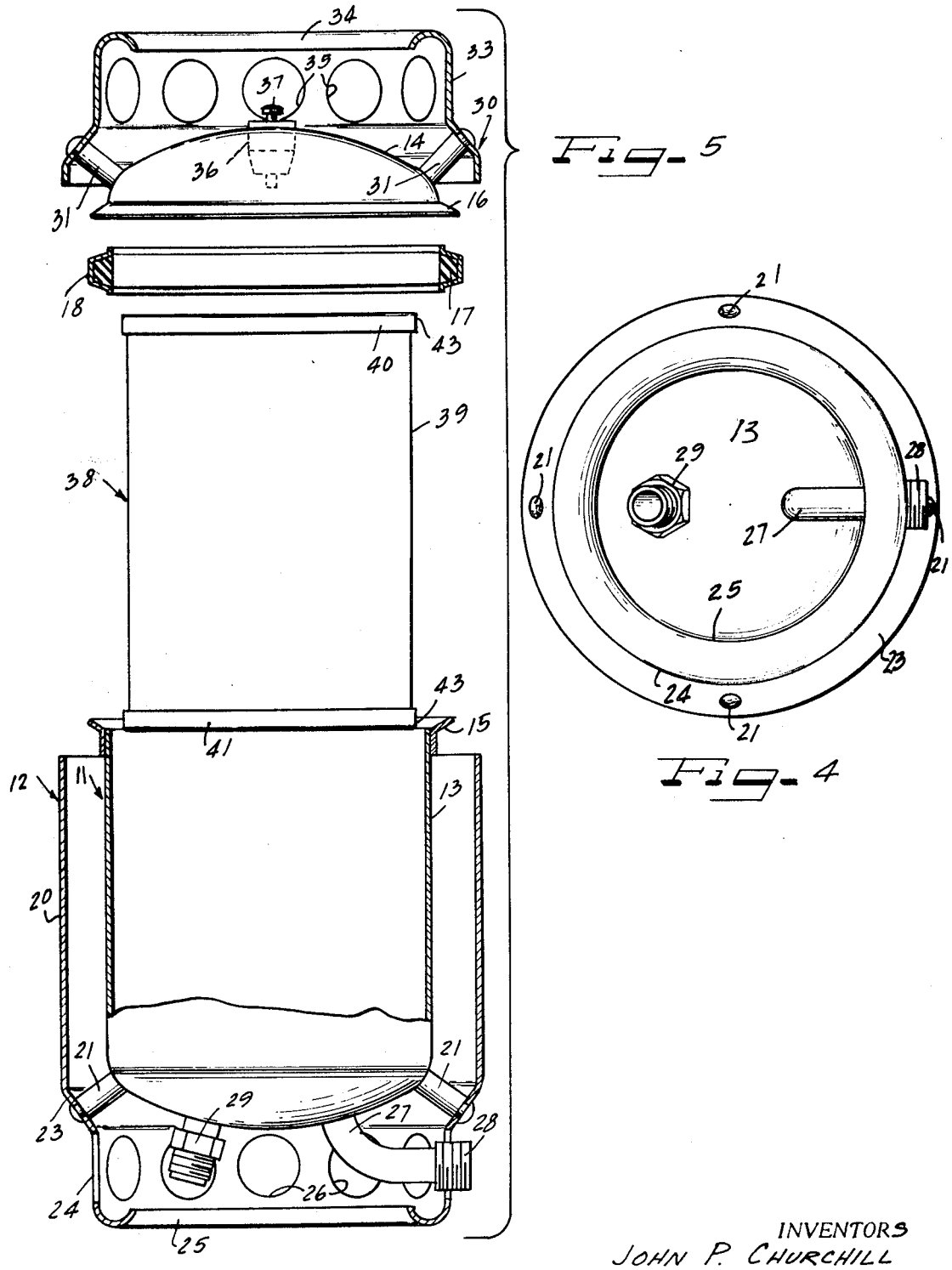

3,737,287
HIGH PRESSURE OXYGEN GENERATOR
John P. Churchill, Indiatlantic, and Tommy Lewis Thompson, Melbourne, Fla., assignors to Life Support, Inc., Melbourne, Fla.
Filed May 17, 1971, Ser. No. 143,852
Int. Cl. B01j 7/00
U.S. Cl. 23—281                                    10 Claims

ABSTRACT OF THE DISCLOSURE

A heat shielded pressure vessel for replaceable chemical oxygen generator canisters receiving oxygen generated from said canisters for delivery to an outlet hose or the like for feeding a welding or cutting torch. The pressure vessel has a cap portion and a main body portion easily and quickly sealed together by a V-band coupler hoop. The cap carries a striking pin to explode a percussion cap in the lid of the canister, a relief valve is provided in the pressure vessel and an outlet conduit extends from the bottom of the vessel to a side coupling for easy attachment to a hose.

BACKGROUND OF THE INVENTION

Field of the invention

This invention pertains to the art of pressure vessels which are easily opened and closed and which detachably support chemical generators releasing gases such as oxygen to the vessel for delivery as needed therefrom. Specifically, the invention pertains to a heat shielded pressure vessel with a removable cover which houses an oxygen generating canister or cell, has externally accessible means for activating the canister, and delivers the oxygen as needed through a convenient outlet.

Description of the prior art

Retorts for receiving chlorate oxygen generating candles are known in the prior art as, for example, in the Geffroy et al. U.S. Pat. 2,775,511, granted Dec. 25, 1956. Such retorts required the candle to be ignited before insertion into the retort and were also equipped with large oxygen storage tanks.

SUMMARY OF THE INVENTION

According to the present invention a single easily opened and closed pressure vessel receives replaceable oxygen generator cells or canisters which are activated after the vessel is sealed. The vessel is strong enough to withstand relatively high pressures such as might be developed between periods of use of oxygen being generated by the candle. Normally, however, the oxygen is used at a rate developed by the candle.

The pressure vessel is surrounded by a heat shield in spaced relation from the vessel and providing a chimney for flow of air between the vessel and shield to induce cooling.

The heat shield is rigid and strong, protecting the pressure vessel against damage.

The pressure vessel has a removable dome-like cover clamped thereto by a toggle lever actuated V-band coupler. A firing pin is slidably carried at the apex of the dome cover to strike against the percussion cap mounted in the oxygen generator canister to initiate decomposition of the chlorate candle. The canister is easily dropped into the vessel and clamped between supports to be fixedly held while allowing free circulation of oxygen therearound to the outlet of the vessel.

It is then an object of this invention to provide a heat shielded pressure vessel for chemical gas generators.

Another object of the invention is to provide a carrier for chemical oxygen generator cells which will receive oxygen from the cell and discharge the oxygen to an outlet conduit.

Another object of the invention is to provide a high pressure container for oxygen generator canisters which will activate the canister, receive the oxygen therefrom, and deliver the oxygen to an outlet while dissipating heat from the canister.

A specific object of this invention is to provide a receptacle into which oxygen generator cans can easily be dropped, which can be quickly and easily sealed, which will activate the oxygen generator canister and will deliver generated oxygen to an outlet.

Another object of the invention is to provide a pressure vessel receiving oxygen generator canisters and creating a chimney for inducing cooling air currents to dissipate heat from the canister.

Other and further objects of this invention will be apparent to those skilled in this art from the following detailed description of the annexed sheets of drawings which, by way of a preferred example only, illustrate one embodiment of the invention.

BRIEF DESCRIPTION OF THE DRAWINGS

FIG. 1 is a side elevational view of the oxygen generator of this invention;

FIG. 2 is a top plan view taken along the line II—II of FIG. 1;

FIG. 3 is a vertical cross-sectional view taken along the line III—III of FIG. 1;

FIG. 4 is a bottom plan view taken along the line IV—IV of FIG. 1; and

FIG. 5 is an opened up or exploded view of the components of the generator.

BRIEF DESCRIPTION OF THE PREFERRED EMBODIMENT

The generator 10 is composed of a metal pressure vessel 11 surrounded in spaced relation by a heat shield 12. The pressure vessel 11 includes a cup-shaped main body 13 covered by a domed lid 14. The open top mouth of the cup 13 is surrounded by an external flange 15. The open bottom of the cover or lid 14 is surrounded by a similar flange 16. A sealing gasket 17 is interposed between the flanges 15 and 16. A band coupler ring 18 embraces the flanges 15 and 16 and the gasket 17. The coupler has a V-shaped interior recess and when tightened around the flanges will draw the same axially together into sealing engagement with the gasket 17. The coupler 18 is split and a toggle latch 19 connects the split ends and draws the same together to tighten the band around the flanges.

The heat shield 12 has an open ended cylindrical body portion 20 surrounding the cup 13 in spaced relation and connected thereto by a plurality of spacer pins 21 diverging from the bottom of the cup and having head portions 22 inside of the cup for a purpose to be more fully hereinafter described. The bottom marginal portion of the cylindrical shield 20 converges inwardly at 23 to a reduced diameter cylindrical bottom portion 24 with a large diameter aperture 25 therethrough. The reduced diameter portion 24 also has apertures 26 in spaced relation therearound. The bottom of the cup 13 is held above the bottom portion 24 of the heat shield by the spacer pins 21. An outlet tube 27 communicates with the interior of the cup 13 and extends from the bottom laterally to a coupling 28 affixed in the portion 24. This coupling 28 is adapted to be connected to a welding hose or the like.

The bottom of the cup 13 also has a depending pressure relief valve 29 projecting into the reduced diameter area 24 of the heat shield and terminating above the open bottom aperture 25 thereof. The relief valve is spring biased and adapted to open under a predetermined internal pressure in the pressure vessel 11.

The heat shield also has a cup portion 30 surrounding the lid or cover 14 in spaced relation and mounted thereon by means of spacer pins 31 also having internal heads 32 for a purpose to be hereinafter described. The cover portion 30, like the bottom portion 20, also has a reduced diameter portion 33 and a large open top aperture 34 with a ring of apertures 35 in spaced relation therearound.

The apex of the domed cover or lid 14 has a boss 36 slidably supporting a striking pin 37 depending into the cover.

An oxygen generator cell in the form of a tin-plated steel can 38 has a conventional cylindrical body portion 39 with a flat top lid 40 and a flat bottom 41 secured to the top and bottom ends of the cylindrical body 39 by the conventional outwardly rolled beaded rims 43. The bottom rim 43 rests on the heads 22 of the pins 21 to hold the can 38 in spaced relation from the bottom of the cup 13. When the lid 14 is clamped in position, the heads 32 of the pins 31 engage the top beaded rim 43 to likewise hold the top of the can in spaced relation from the cover and to coact with the bottom pin heads to clamp the can fixedly in the pressure vessel 11.

The top lid 40 has a ring of apertures 44 surrounding a central washer secured in the lid carrying a percussion cap 45 adapted to be engaged by the striking pin 37 to ignite ignition material 46 such as gun-powder filling the aperture of a ceramic fibrous mat "M" between the lid 40 and the top of the chlorate candle 47 mounted in the can 38. This chlorate candle is a compacted mass of sodium chlorate and a catalyst such as sodium peroxide and has in its top end thereof an ignition cone 48 of pyrotechnic material ignited from the ignition material 46 to initiate the burning of the candle for liberating oxygen. The liberated oxygen will flow around the candle in the pressure vessel 11 to the outlet tube 27.

To place the generator in operation, it is only necessary to drop the can 38 into the open top of the cup 13 to rest on the pin heads 22. Then the lid is placed over the open mouth of the cup with the gasket 17 therebetween and the clamping band 18 is drawn tightly around the flanges 15 and 16 by swinging the toggle latch 19 to its closed position. This will cause the pin heads 32 to engage the top bead 43 of the can and clamp the can fixedly in the closed pressure vessel 11. Then the pin 37 is struck with a hammer or the like to explode the percussion cap 45 which in turn ignites the starting materials 46 and 48 to initiate the burning of the candle 47 in the can. The heat generated from the decomposition of the sodium chlorate will be rapidly dissipated through the can walls and walls of the pressure vessel which are cooled by convection air currents created between the pressure vessel and the heat shield. A chimney effect is created by the heat shield with the air entering the bottom holes 26 flowing upwardly through the annular space between the pressure vessel and heat shield, and then rising through the top cover portion of the heat shield out of the open top 34 thereof. Additional air will be swept into the space between the lid 14 and the top cover portion 30 of the heat shield from the air gap 49 surrounding the coupling band 18 between the heat shield portions 20 and 30.

The pressure vessel 11 is preferably composed of heavy gauge steel capable of withstanding appreciable pressures so that in the event of pressure build-up during the burning of the candle 47, such as might occur during periods of non-use of the oxygen, the pressure vessel will be capable of retaining the released oxygen surrounding the can 38. The oxygen, of course, emerges from the orifices 44 and will fill the space between the can and the pressure vessel. In the event of development of excess pressures, the relief valve 29 will open to relieve the pressures.

From the above description it will thus be understood that the invention provides an oxygen generator vessel easily and quickly receiving oxygen generating cells and effective to initiate activation of the cells and feed the released oxygen to an outlet which can be connected to a welding hose or the like for supplying a cutting or welding torch. The unit of this invention includes a heat shield protecting the operator against burning and also setting up a chimney around the pressure vessel to rapidly dissipate heat therefrom.

We claim as our invention:

1. Apparatus for storing and delivering gas from a chemical gas generator canister replaceably mounted therein which comprises a cup-shaped pressure vessel, a lid closing the top of said vessel, means for clamping the lid and vessel in sealed relation to provide a pressure chamber, means in the lid and vessel cooperating to clamp a gas generator can in the vessel in spaced relation from the walls thereof and providing a gas flow path between the can and vessel, said can having a discharge orifice communicating with said path, said vessel having an outlet conduit joining the gas flow path with the exterior of the vessel, means carried by said lid actuated from outside the lid to activate the gas generating can for delivery of gas through the discharge orifice of the can to the flow path, a heat shield surrounding the vessel and lid in spaced relation and having open top and bottom portions providing a chimney accommodating induced circulation of air for cooling heat released from the can during gas generation therein whereby said apparatus will retain the generated gas until needed at the outlet without closing the can orifice thereby preventing pressure buildup in the can.

2. Apparatus for delivering oxygen as needed from a can containing a chlorate candle which when activated will release heat and continue to deliver oxygen until exhausted which comprises a pressure vessel having an open top and a closed bottom, a lid for closing said open top of the pressure vessel, means for securing said lid and vessel in sealed relation to provide a pressure chamber, means in said vessel and in said lid adapted to engage the ends of a can containing a chlorate candle and ignition material for starting the burning of said candle to release oxygen, said means holding said can in spaced relation from the vessel and lid to provide a space surrounding the can to receive oxygen therefrom, an outlet tube communicating with said space to deliver oxygen therefrom, mechanism actuated from outside said apparatus for activating ignition material in the can in the apparatus, a heat shield surrounding said pressure vessel in spaced relation therefrom and having an open top and a ported bottom below the bottom of said vessel, a second heat shield overlying said lid in spaced relation and having an open bottom and a ported top, said open top of the heat shield surrounding the pressure vessel being spaced below and aligned with the open bottom of the heat shield surrounding the lid whereby the heat of chemical reaction from burning the chlorate candle in said can will radiate through said can, said pressure vessel and said lid creating an induced circulation of air from the ported bottom of the heat shield surrounding the pressure vessel to the ported top of the heat shield surrounding the lid with additional air being drawn into the space between the heat shields, and said space in the pressure chamber surrounding the can will receive oxygen from the can and store the same until needed at the outlet.

3. The apparatus of claim 1 wherein the heat shield underlies the bottom of the pressure vessel and has ports supplying air to the chimney.

4. The apparatus of claim 1 including spacer pins radiating from the pressure vessel and lid and supporting the heat shields in spaced relation therefrom.

5. The apparatus of claim 4 wherein the pins have heads inside the pressure vessel and lid to engage the ends of the can for clamping the can in spaced relation from the walls of the pressure vessel and lid.

6. The apparatus of claim 1 including a pressure relief valve extending from the bottom of the pressure vessel in spaced relation from the heat shield.

7. The apparatus of claim 1 wherein the heat shield has a cylindrical imperforate body portion surrounding the pressure vessel with a reduced diameter apertured bottom portion below the vessel.

8. The apparatus of claim 15 wherein the heat shield has reduced diameter top and bottom portions overlying the lid and underlying the pressure vessel respectively.

9. Apparatus for chemically generating and delivering oxygen as needed from a replaceable canister having a chlorate candle therein which comprises a cup-shaped receptacle, a cover for said receptacle, means clamping the cover and receptacle together to provide a pressure chamber, and outlet conduit extending from said chamber, means in said chamber for supporting a canister containing a chlorate candle in spaced relation from the walls of the chamber to provide a gas flow path therearound, means carried by the cover for engaging mechanism in the canister to initiate burning of the chlorate candle therein for delivery of oxygen to the chamber to be dispensed as needed from the outlet, and a heat shield surrounding said receptacle in spaced relation therefrom having apertures in the top and bottom thereof to provide a chimney for circulation of air to cool the apparatus.

10. The apparatus of claim 9 wherein the cover is domed and a separate heat shield overlies the cover in spaced relation therefrom.

References Cited

UNITED STATES PATENTS 3,580,250    5/1971    Oroza       23—281 X
3,573,001    3/1971    Bovard      23—281

JAMES H. TAYMAN, Jr., Primary Examiner

U.S. Cl. X.R.

23—284; 128—203, 191; 165—128